(12) United States Patent
Solis

(10) Patent No.: US 9,784,062 B1
(45) Date of Patent: Oct. 10, 2017

(54) PIPE CUTTING AND PLUGGING DEVICE

(71) Applicant: Horacio Solis, Westmount (CA)

(72) Inventor: Horacio Solis, Westmount (CA)

( * ) Notice: Subject to any disclaimer, the term of this patent is extended or adjusted under 35 U.S.C. 154(b) by 0 days.

(21) Appl. No.: 15/462,851

(22) Filed: Mar. 18, 2017

Related U.S. Application Data

(60) Provisional application No. 62/310,146, filed on Mar. 18, 2016.

(51) Int. Cl.
*E21B 29/12* (2006.01)
*E21B 33/12* (2006.01)
*B23D 57/00* (2006.01)
*B23D 45/12* (2006.01)

(52) U.S. Cl.
CPC .............. *E21B 29/12* (2013.01); *B23D 45/12* (2013.01); *B23D 57/0084* (2013.01); *E21B 33/12* (2013.01)

(58) Field of Classification Search
CPC ...... E21B 29/12; E21B 33/12; E21B 43/0122; B23D 45/12; B23D 57/0084
See application file for complete search history.

(56) References Cited

U.S. PATENT DOCUMENTS

| | | | |
|---|---|---|---|
| 3,603,387 A * | 9/1971 | Schoeffler ............ | B23D 45/003 137/318 |
| 3,828,408 A * | 8/1974 | Ortiz ....................... | E21B 29/12 166/55 |
| 4,441,328 A | 4/1984 | Brister | |
| 4,443,129 A | 4/1984 | de Sivry et al. | |
| 4,450,857 A | 5/1984 | Baugh et al. | |
| 4,461,354 A * | 7/1984 | Buras ..................... | E21B 19/16 166/343 |
| 4,832,530 A | 5/1989 | Andersen et al. | |
| 5,213,157 A * | 5/1993 | Wills ...................... | E21B 33/02 166/57 |
| 5,217,073 A * | 6/1993 | Bruns .................... | F16L 55/105 166/298 |
| 5,361,748 A | 11/1994 | Matteucci | |
| 5,361,840 A * | 11/1994 | Matthews ............... | E21B 29/00 166/135 |
| 5,439,331 A | 8/1995 | Andrew et al. | |
| 5,676,492 A | 10/1997 | Van Steijn | |
| 6,012,878 A | 1/2000 | Hicks | |
| 6,125,928 A * | 10/2000 | Ninivaara ............... | E21B 29/08 137/318 |
| 6,189,620 B1 * | 2/2001 | McDowell .............. | E21B 19/16 166/379 |
| 6,267,037 B1 | 7/2001 | McCoy, Jr. et al. | |
| 6,488,094 B1 * | 12/2002 | McDowell .............. | E21B 19/16 166/379 |

(Continued)

*Primary Examiner* — Matthew R Buck
(74) *Attorney, Agent, or Firm* — Thomas G. Ference

(57) ABSTRACT

A device for cutting and plugging underwater pipes, the device includes a frame with one or more clamps for securing the device to the pipe. Attached to the frame is an arm having a first end and a second end. The first end is attached to an actuation element that in combination with a support bar can pivot and extend the arm. A motor is attached to the second end of the arm. A saw blade and pipe plug is concentrically mounted to the motor. The motor powers the saw blade to cut the pipe transversely. The arm then positions the pipe plug concentric with the cut pipe, and in combination with rotation of the motor, plugs the cut pipe with the pipe plug.

24 Claims, 17 Drawing Sheets

(56) References Cited

U.S. PATENT DOCUMENTS

| | | | |
|---|---|---|---|
| 7,036,599 B2 | 5/2006 | Matteucci | |
| 7,090,019 B2 | 8/2006 | Barrow et al. | |
| 7,341,109 B1 * | 3/2008 | McDowell | E21B 19/16 |
| | | | 166/379 |
| 7,922,424 B2 | 4/2011 | Clark, II | |
| 8,109,693 B1 | 2/2012 | Clark, II | |
| 8,465,227 B1 | 6/2013 | Clark, II | |
| 8,657,006 B2 | 2/2014 | Mire | |
| 8,695,711 B2 * | 4/2014 | Kocaman | E21B 33/134 |
| | | | 166/351 |
| 8,720,585 B2 * | 5/2014 | Mothaffar | E21B 33/12 |
| | | | 166/192 |
| 8,925,589 B2 | 1/2015 | Tomimbang | |
| 9,010,435 B2 | 4/2015 | Matsur | |

* cited by examiner

US 9,784,062 B1

PIPE CUTTING AND PLUGGING DEVICE

RELATED APPLICATIONS

This application claims the benefit of priority of U.S. Provisional Patent Application No. 62/310,146, filed Mar. 18, 2016, which is herein incorporated by reference.

FIELD

The present invention relates to a device for cutting and plugging subsea fluid conductors under high pressure. More particularly the device can be used as an emergency plugging tool to stop leaking fluid to the environment from a damaged oil well.

BACKGROUND

The world's increase in demand for petroleum has pushed oil companies to explore areas where only a few decades ago it was considered as unattainable to drill for oil. Today subsea offshore drilling at depths of hundreds or thousands of feet is common. As the depth of exploration grows the technical challenges increase exponentially. It has become a very risky task to manage safely and efficiently drilling or production equipment at depths of 5,000 feet or more.

Take for instance the relatively recent BHP incident (2010) of the Macondo well in the Gulf of Mexico. Regardless if the reason for the accident was purely technical or by human responsibility the fact is that an uncontrolled oil spill occurred. For more than two months millions of gallons of oil leaked into the ocean out of control. The resulting environmental catastrophe brought a cluster of economic, social and environmental consequences that will last for years. The heavy burden of this misfortune falls on the shoulders of common people not related to the oil business. When such a disaster occurs the way of life of people that depend in one way or another on natural resources like fishery, tourism, etc., is adversely affected without possibility of recovery. It is clear that the trend to drill deeper wells will be maintained as long as the business continues to be highly profitable. For that reason new technical proposals need to be developed to confront and prevent possible catastrophes when things go wrong.

It is the intent of the present invention to provide an alternative technical resource to be used as an emergency tool if a leaking pipe goes out of control. It is expected that the device proposed could contribute in many cases as a temporary solution under emergency situations and win the most precious element while a permanent solution is found: time.

SUMMARY

It is therefore an object of this invention to provide an improve device and method that may be used to stop out of controlled oil fluids leaking from pipes. The device can be remotely operated from subsea or surface facilities (remotely operated vehicle, drilling platform, vessel, etc.). The device for cutting and plugging an underwater pipe comprises a frame. The frame supports at least one clamp for attaching the frame to the pipe. The device further has an arm with first and second ends. An actuation element is integrated with the frame. The first end of the arm is connected to the actuation element. A cutting device is attached to the second end of the arm. The cutting device is positionable by the arm to cut the pipe transversely to the pipe axis. A pipe plug is mounted to the second end of the arm. After cutting, the pipe plug is centered by the arm with respect to the axis of the pipe and the plug is moved along that axis and inserted into the cut pipe. In a preferred embodiment, the device is operated hydraulically.

BRIEF DESCRIPTION OF DRAWINGS

For the purposes of illustrating the invention, the drawings show aspects of one or more embodiments of the invention. However, it should be understood that the present invention is not limited to the precise arrangements and instrumentalities shown in the drawings, wherein:

FIG. 6b is a partial cut away bottom view of the device of FIG. 6a;

FIG. 7b is a partial cut away bottom view of the device of FIG. 7a

FIG. 8b is a partial cut away bottom view of the device of FIG. 8a;

FIG. 9b is a partial cut away bottom view of the device of FIG. 9a;

DETAILED DESCRIPTION

Figure 1:
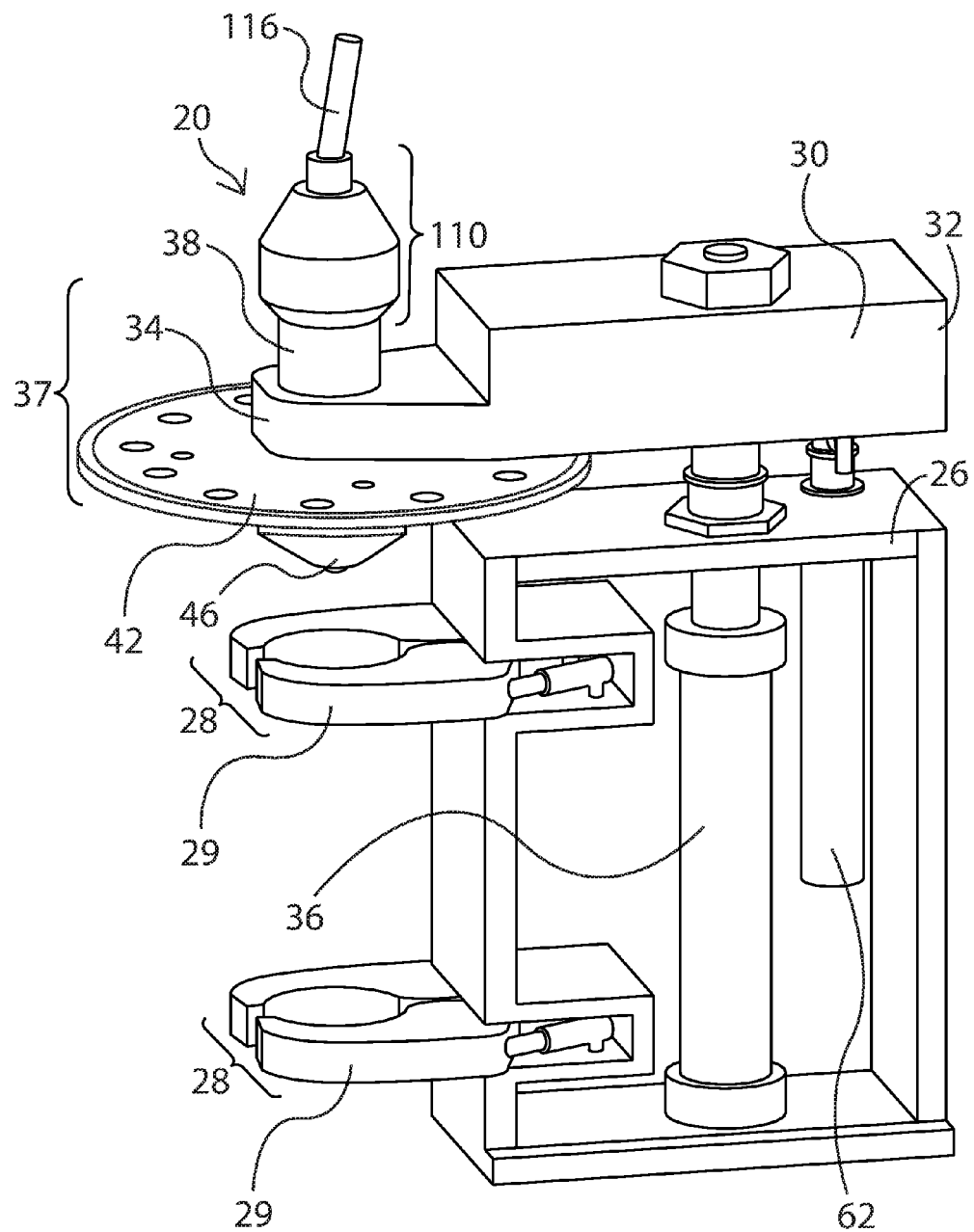
FIG. 1 is a perspective view of the pipe cutting and plugging device.

FIGS. 1-17 show various aspects of device 20 for cutting and plugging an underwater pipe 22 leaking a hazardous fluid 24 such as oil. Referring to FIG. 1, device 20 comprises a frame 26 supporting at least one clamp 28 for attachment to pipe 22. Clamps 28 preferably have a pair of symmetric jaws 29, but may be any kind of clamp that can be securely attached to pipe 22. Clamp 28 is preferably a pair of clamps that can securely fix device 20 in a spaced-apart arrangement along pipe 22 having a pipe axis 44. The spaced-apart arrangement allows for more stable and secure attachment to the pipe. Mounted to frame 26 is an arm 30 having a first end 32 and a second end 34. Although arm 30 is shown as a single, solid perpendicular plate, it is understood that other types of mechanical arms could be fabricated that are not strictly perpendicular or have mechanical structures that have multiple joints and could function in a similar manner. An actuation element 36 is integrated with frame 26. Actuation element 36 is connected proximate first end 32 of arm 30. A cutting device 37 is attached proximate to second end 34 of arm 30. Cutting device 37 may be a rotary saw, a band saw, a laser or other appropriate pipe cutting device. In the embodiment shown in FIG. 1, cutting device 37 is a rotary saw powered by a motor 38. Motor 38 has a motor shaft 40. Saw blade 42 is mounted to motor shaft 40. Saw blade 42 is positionable by arm 30, which is moved by actuation element 36, to cut pipe 22 transversely to pipe axis 44. A pipe plug 46, for plugging pipe 22 after the pipe has been cut, is mounted concentric with motor shaft 40.

Figure 2:
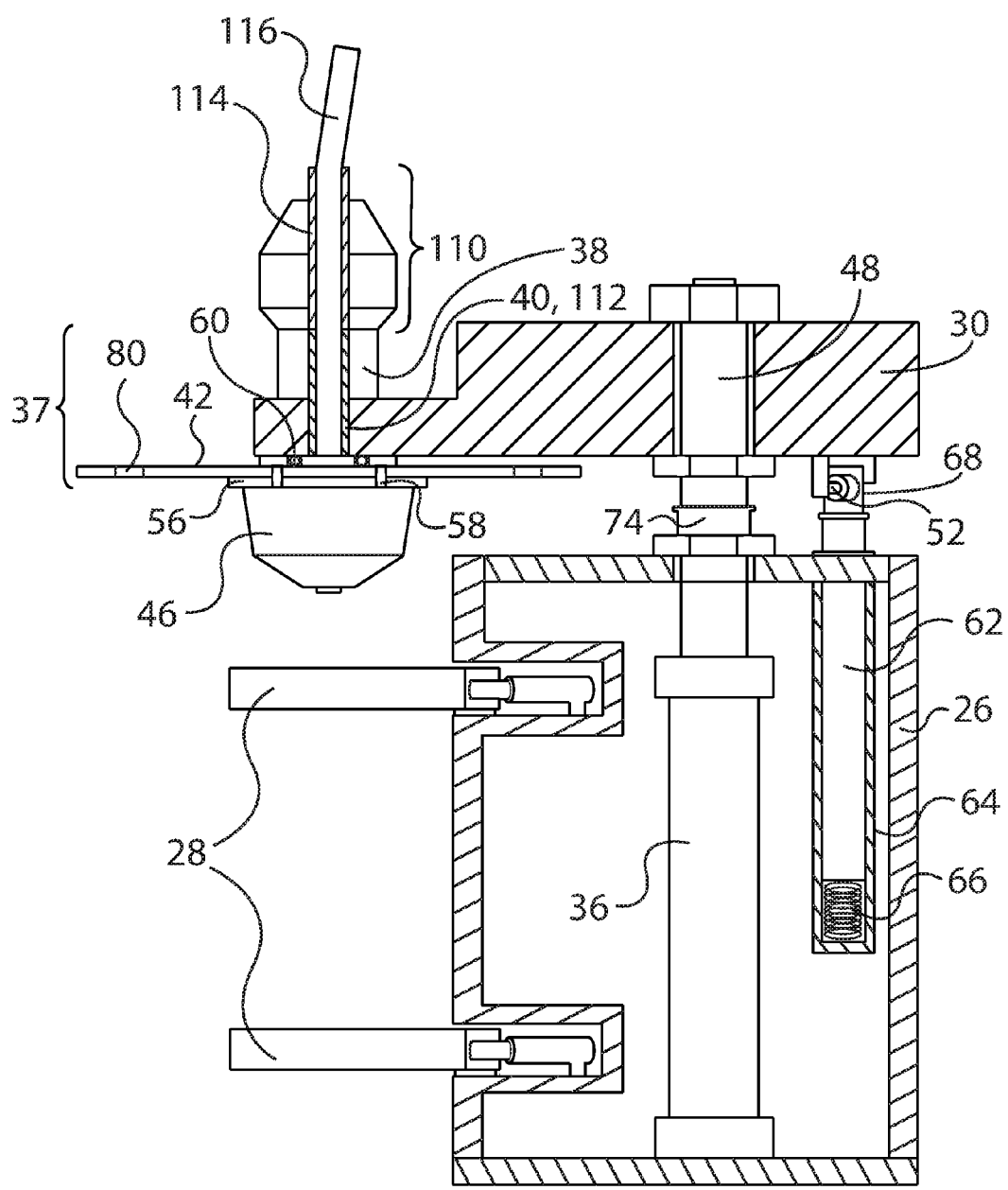
FIG. 2 is a partial cut away side view of FIG. 1 showing greater detail of the various components of the present invention.
Figure 8A:
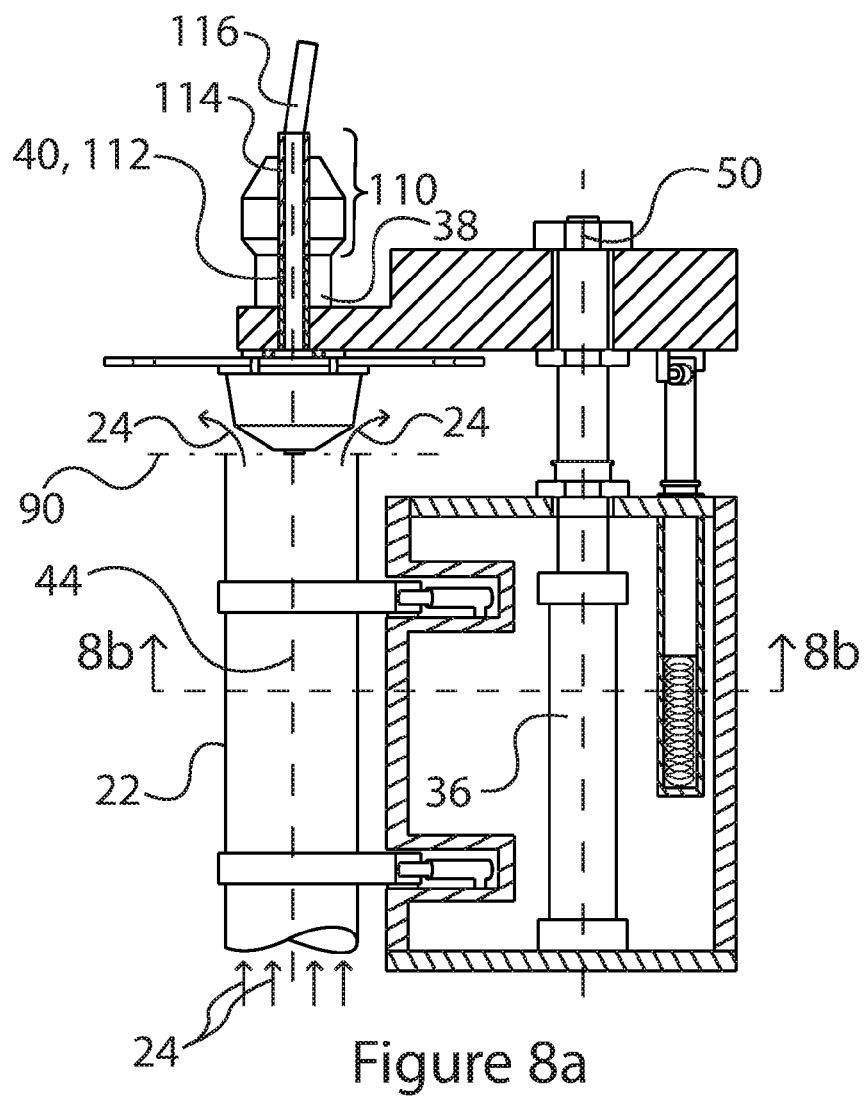
FIG. 8a is a modified view of FIG. 2 showing a third operational state of the device with the clamps holding firmly the pipe and the arm in an "extended" position where the leaking pipe has been cut and the device arm is extended.
Figure 8B:
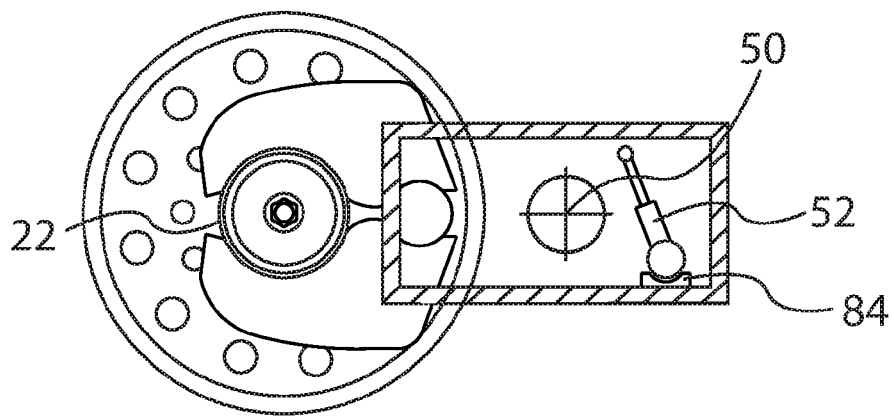
Figure 9A:
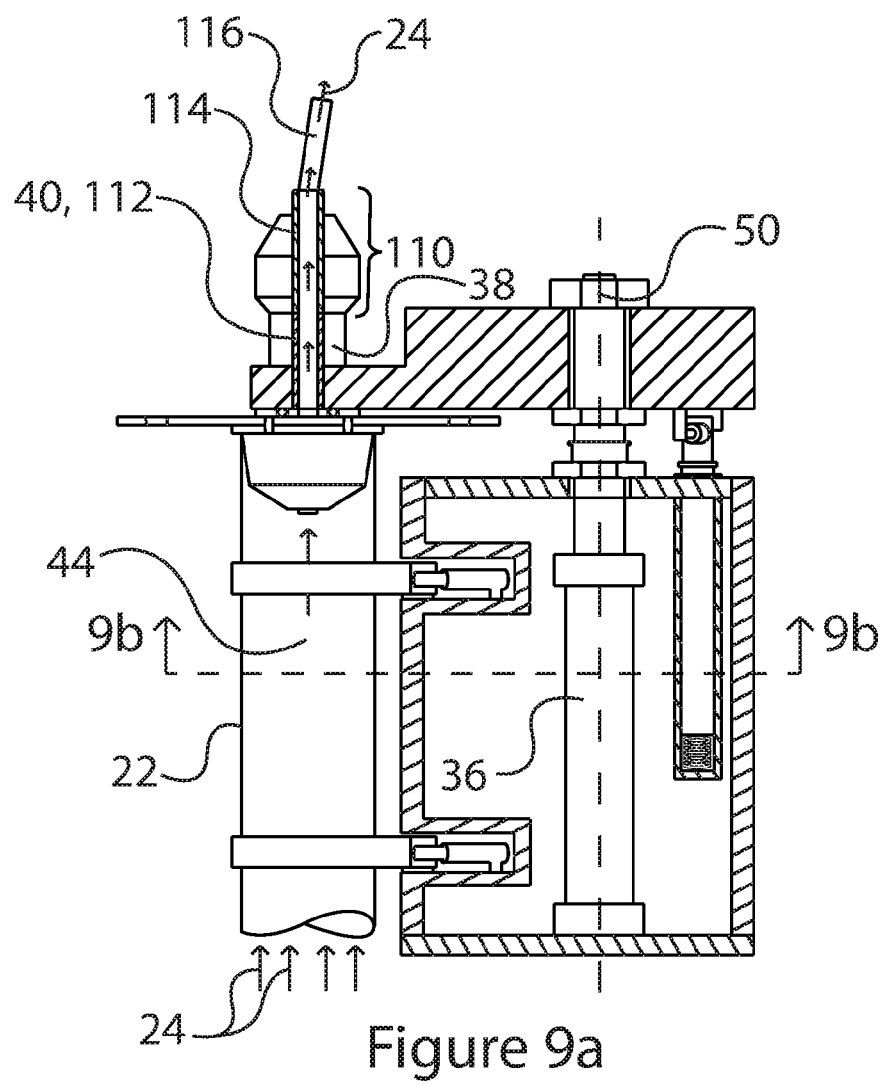
FIG. 9a is a modified view of FIG. 2 showing a fourth operational state of the device with the clamps holding firmly the pipe and arm in a "closed" position so that the device is closed and the pipe sealed.
Figure 9B:
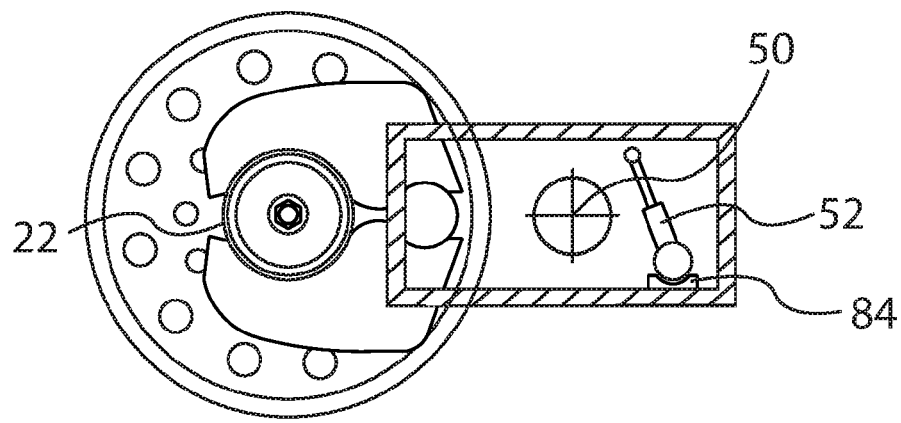

In more detail, FIG. 2, it is shown in one embodiment that frame 26 may be a steel housing. Frame 26 supports actuation element 36. Actuation element 36 is preferably a heavy-duty double action hydraulic main cylinder. Actuation element 36 has an actuation rod 48 with an actuation rod axis 50. Actuation rod 48 is extendable and retractable along actuation rod axis 50. Actuation rod 48 is extendable and retractable parallel to pipe axis 44 when device 20 is secured in place on pipe 22. First end 32 of arm 30 is rotatably connected to actuation rod 48. A pivot cylinder 52 is provided for rotating arm 30 around actuation rod axis 50. Externally to frame 26 actuation rod 48 is fixed to arm 30. Motor 38 is mounted to arm 30 at a predetermined distance from actuation rod 48, with motor shaft 40 traversing perpendicular to arm 30. Motor shaft 40 is preferably connected perpendicular to arm 30. Connected to motor shaft 40 is pipe plug 46, seal 56 and saw blade 42. All components may be joined by flat cap screws 58 or other fasteners. Between the head assembly (pipe plug 46, seal 56, saw blade 42) and arm 30 is the thrust cylindrical roller bearing 60 that permits the rotational movement of the head transmitted by motor 38. Support bar 62 is partially inserted in tubular support 64 which contains pushing spring 66 or other type of biasing element. The outward end of support bar 62, external to frame 26, acts as lower support for the cast steel rear clevis 68 of double action pivot cylinder 52. The piston rod 51 of pivot cylinder 52 is fixed to arm 30 by a rod mount 72 (see FIG. 4 for more detail). Both rear clevis 68 and rod mount 72 are mounted with spherical ball bushings supports. Front round flange 74 is equipped with internal bearings to relieve side loads and avoid rod buckling. The stroke of pivot cylinder 52 determines the position of the device between "open" (FIGS. 6a and 6b), "intermediate" (FIGS. 7a and 7b), "extended" (FIGS. 8a and 8b) and "closed" (FIGS. 9a and 9b). In the preferred embodiment all moving parts are operated hydraulically. For more clarity of the drawings, hoses connected to the hydraulic components have not been shown.

Figure 3:
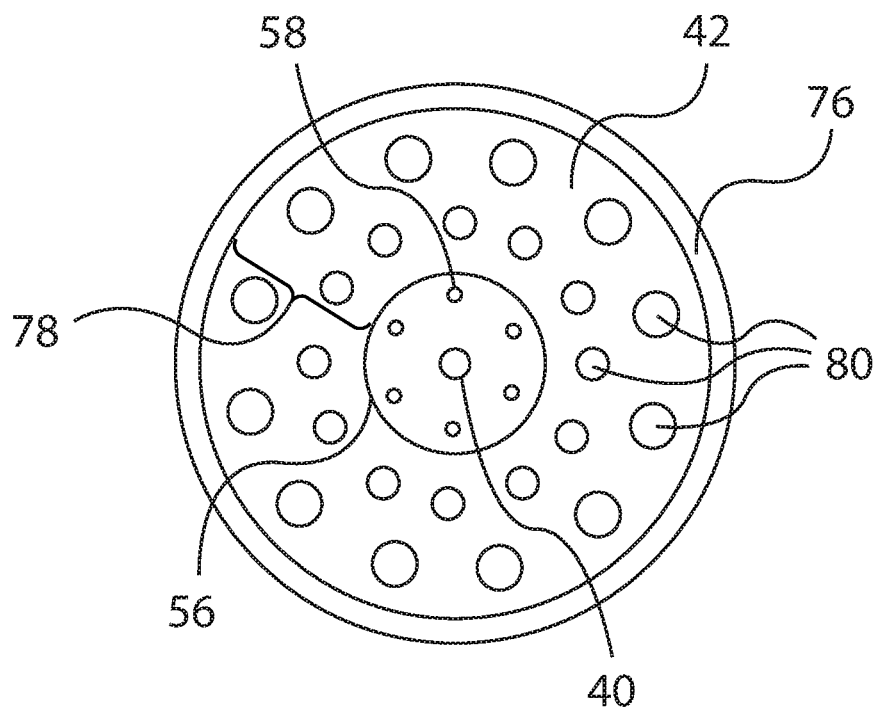
FIG. 3 is a bottom view of the diamond cutting saw blade of FIG. 2.

FIG. 3 shows the special design of saw blade 42. Saw blade 42 is preferably a high diameter circular diamond saw blade. Blade 42 has a continuous diamond-tipped cutting rim 76 and a regularly perforated main body 78. Holes 80 in blade 42 allow the release of pipe pressure during cutting. Main body 78 may also be a trellis, lattice or grating. Central circles represent schematically the pipe plug 46, seal 56, screws 58 and motor shaft 40.

Figure 4:
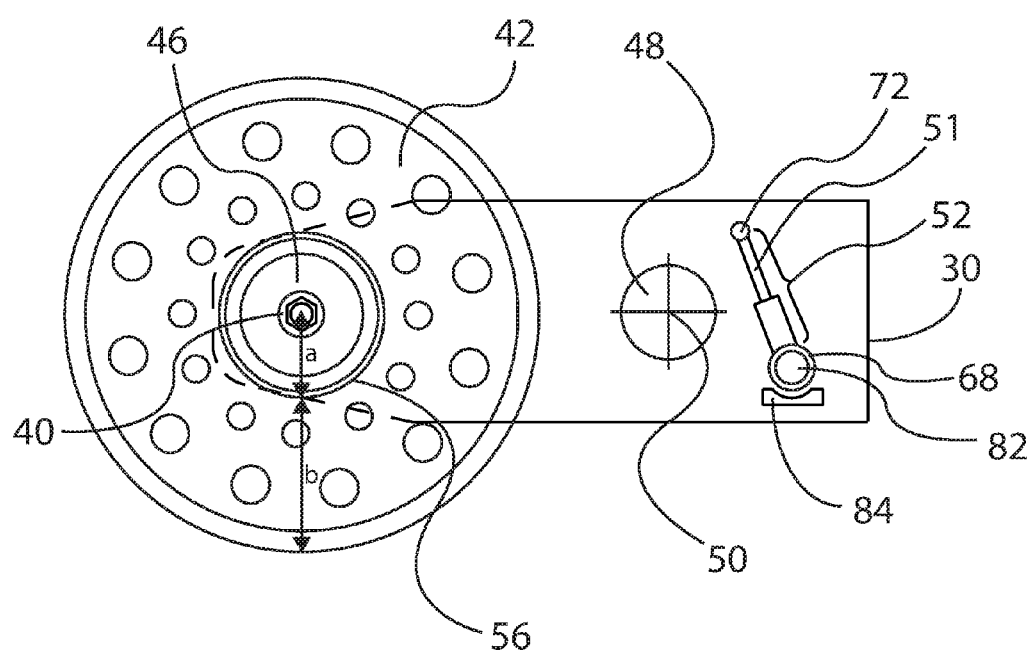
FIG. 4 is a bottom view of the arm shown in FIG. 2, showing the general shape of the arm which supports the set of cutting assembly parts and the relative position of the arm's center of rotation with respect to the cutting saw.

FIG. 4 represents one embodiment of arm 30 where the arm is composed a steel plate with superposition as semi-transparency the relative position of saw blade 42. The central circle is the bottom view of the shaft 40 of motor 38. Note that, for a correct function of the device, the distance existent between the center of shaft 40 to the border of arm 30 needs to be shorter than the distance between the border of the arm and the external diameter of saw 42 (a<b). Schematically the axis of actuation rod 48 is shown as a circle. Actuation rod 48 is what arm 30 pivots upon relative to heavy-duty double action actuation element 36 (main cylinder). Pivoting occurs by extension or retraction of pivot cylinder 52. Pivot cylinder 52 is fixed by rear clevis 82 to support bar 62 and the opposite end fixed to arm 30 by rod mount 72. Note that support bar 62 and arm 30 are not physically connected between them but through pivot cylinder 52. Pushing or pulling from pivot cylinder 52 against support bar 62 causes arm 30 to rotate freely around actuation rod axis 50 of actuation element 36. Arm stop 84, fixed to arm 30, limits the turn of the arm.

Figure 5:
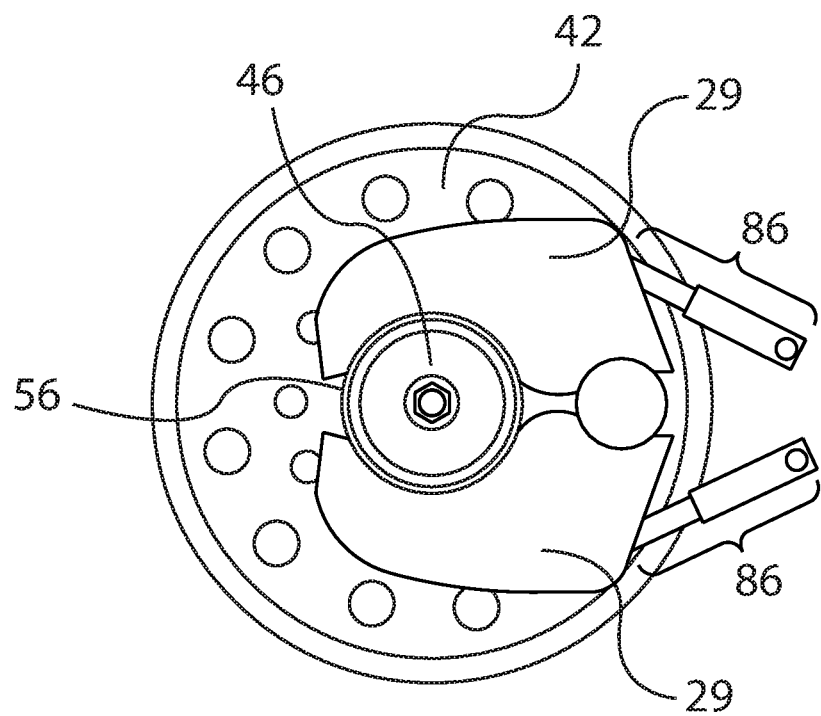
FIG. 5 is a bottom view of the top clamp shown in FIG. 2, showing the relative final position of the clamp and saw after cutting and plugging the pipe ("closed" position)

FIG. 5 shows the relative final position of clamps 28 and saw blade 42 after cutting and plugging ("closed" position). In closed position the central axis of pipe 22 needs to be aligned and coincident with the axis of motor shaft 40 to enable the insertion of pipe plug 46. Clamps 28 are preferably hydraulically operated to open and closed position by hydraulic cylinders 86. Both clamps 28 are firmly bolted (not shown) to frame 26. These types of clamps are of common use in the industry.

Device 20 may comprise swivel 110 that is a rotary tool that permits the free rotation of two different sections of a hollow shaft (motor hollow shaft 112 and swivel hollow shaft 114). Motor hollow shaft 112 rotates while swivel hollow shaft 114 remains stationary. The stationary section provides a connection for a hose 116 and a passageway for the fluids circulating through the shaft to a collecting tanker ship at the surface of the ocean. A swivel 110 is a mechanical device of common use on an oil drilling rig. A swivel in general use on a rig hangs between a traveling block above and the kelly drive below. The swivel provides the ability for the kelly to rotate while allowing the travelling block to remain in a stationary rotational position while simultaneously allowing the introduction of drilling fluid into the hole. In the present device, the swivel adds the capability for motor 38 to rotate while still allowing oil to flow therethrough.

Operation of device 20 is as follows. The device can be operated from a surface support vessel. The support vessel can provide a hydraulic control unit and lines that enable remote operation. Correct final position could be adjusted by the aid of a ROV (Remotely Operated Vehicle).

Figure 6A:
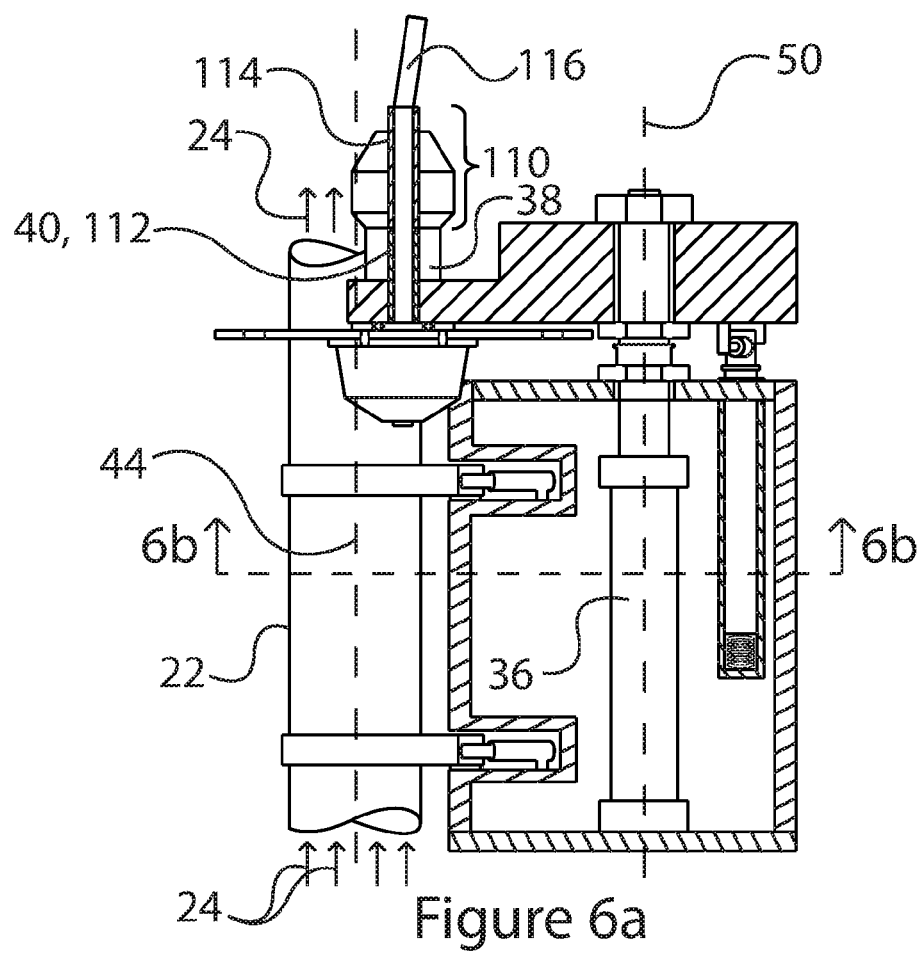
FIG. 6a is a modified view of FIG. 2 showing a first operational state of the device with the clamps holding firmly the pipe and the arm with diamond saw blade in the "open" position prior to initiating cutting of the leaking pipe.

Step 1: First device 20 in "open" position needs to be positioned with clamps 28 open and parallel to pipe 22. Clamps 28 are then closed clamping firmly pipe 22. Actuation element 36 and pivot cylinder 52 are equipped with integrated position transducers (not shown) to control at any moment the stroke of their respective pushing rods. FIG. 6a shows the relative position of device 20 ready to cut pipe 22 with actuation element 36 retracted.

Figure 6B:
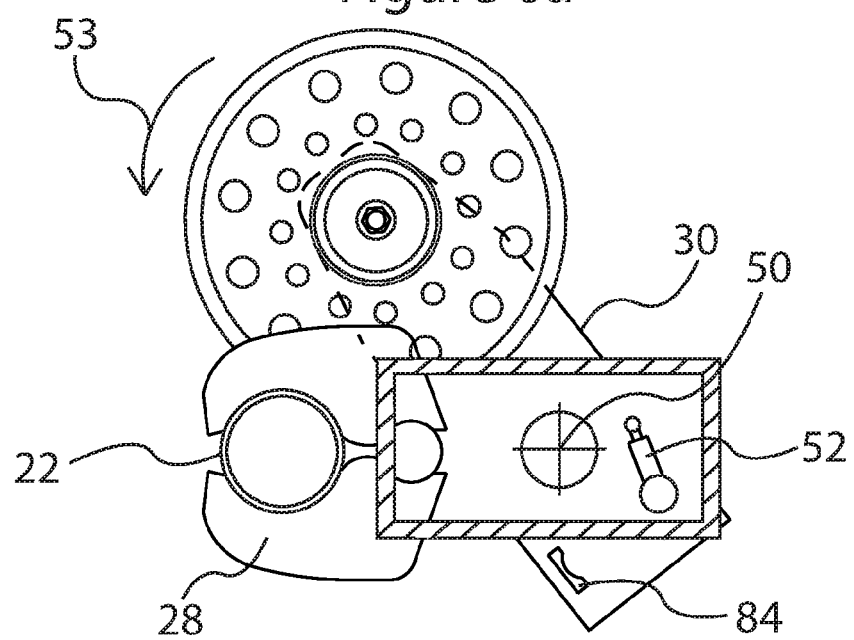

Step 2: FIG. 6b shows clamps 28 firmly grasping pipe 22 with pivot cylinder 52 retracted "open" position prior to initiate cutting. By extension of the rod of pivot cylinder 52, arm 30 (and the assembly parts 38, 40, 42, 46, 56 and 58) turn (see arrow 53) using actuation rod axis 50 of actuation element 36. The arc of rotation is limited by the cylinder transducer (not shown) and/or the arm stop 84 "closed" position.

Figure 7A:
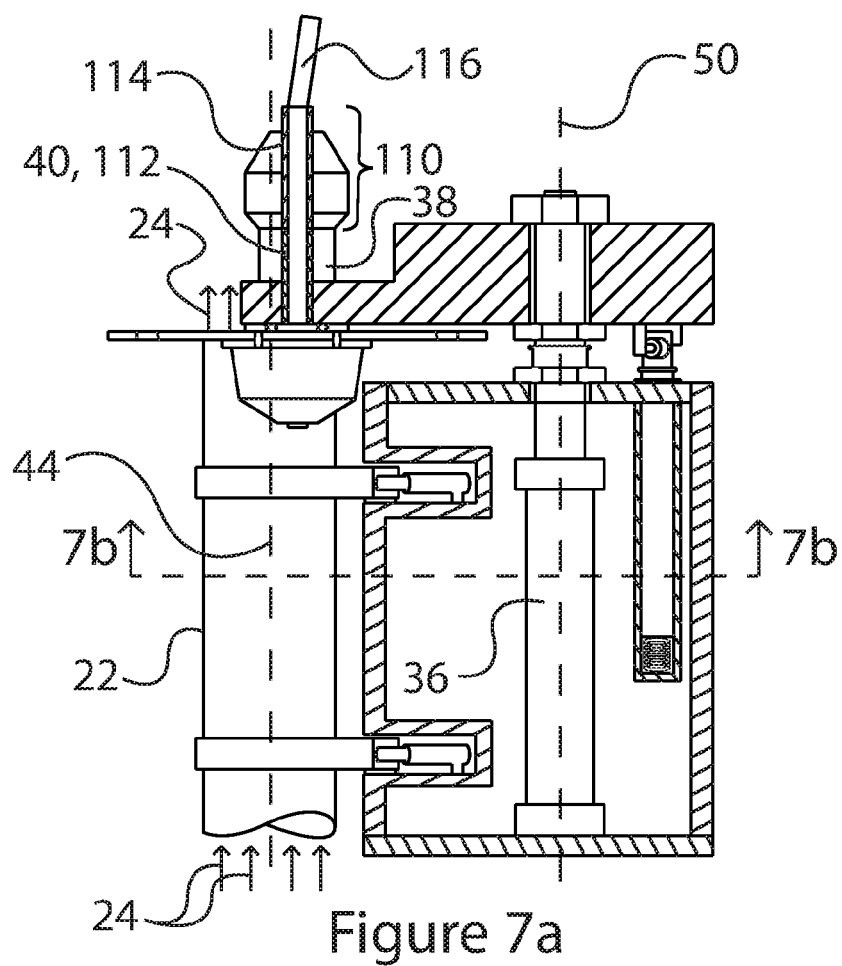
FIG. 7a is a modified view of FIG. 2 showing a second operational state of the device with the clamps holding firmly the pipe and the arm in an "intermediate" position while the cutting the leaking pipe.
Figure 7B:
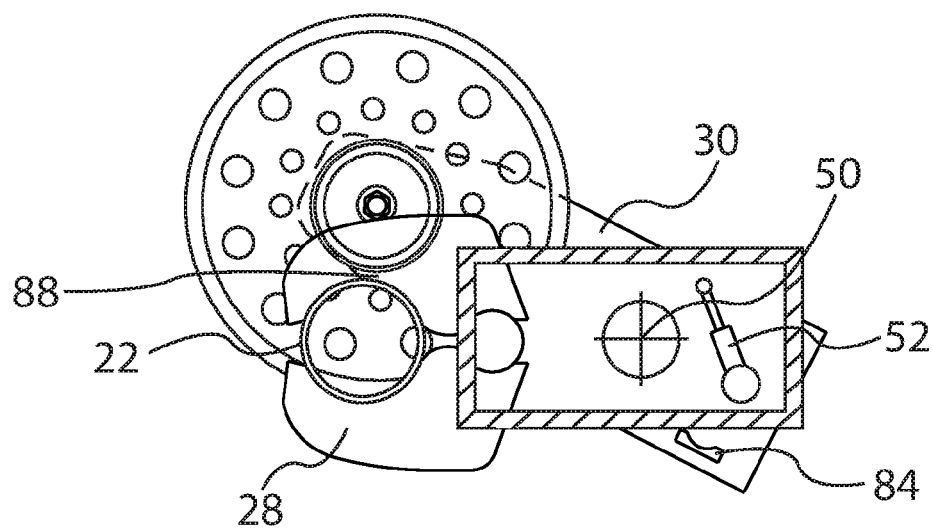

Step 3: FIGS. 7a and 7b show device 20 in "intermediate" position after cutting pipe 22. Pivot cylinder 52 transducer needs to be calibrated to stop cutting when the border of arm 30 touches pipe 22 (see 88).

Step 4: FIGS. 8a and 8b show device 20 in "extended" position. After pipe cutting, actuation rod 48 of actuation element 36 extends until it exceeds the height of pipe plug 46 above the cutting plane 90 of pipe 22. Note that as long as actuation rod 48 extends, support bar 62 also extends pushed by spring 66 to maintain in correct work position of pivot cylinder 52.

Step 5: FIGS. 9a and 9b show the "close" "closed" position of device 20. To achieve this position pivot cylinder 52 needs to extend to maximum stroke turning arm 30. The end of turn is determined by the transducer or, in case of failure, by arm stop 84 (see FIGS. 4 and 6b). In the final position just prior to plugging, the central axis of pipe 22 is coincident with the central axis of motor shaft 40 of motor 38. Now the pipe plug 46 is aligned with pipe 22 so the pipe plug can be inserted.

Step 6: Plugging operation. In a preferred embodiment pipe plug 46 is preferably a solid body plug, or trilobular or hexalobular case-hardened thread-forming tool which, at the same time, acts as a plug. To start the internal thread-forming process in pipe 22 actuation element 36 retracts its actuation rod 48 and simultaneously motor 38 turns at maximum torque. The process continues until pipe plug 46 is totally inserted into pipe 22 and seal 56 presses against the annular cut surface of the pipe. FIG. 9a shows device 20 closed and pipe 22 sealed. Because of the high diameter of saw blade 42, motor 38 works at low rpm with the consequent benefit of increasing the torque, necessary to thread the pipe. Seal 56 could be made of synthetic rubber, lead, soft metal alloy, synthetic polymer, silicone or any appropriated material.

Figure 10:
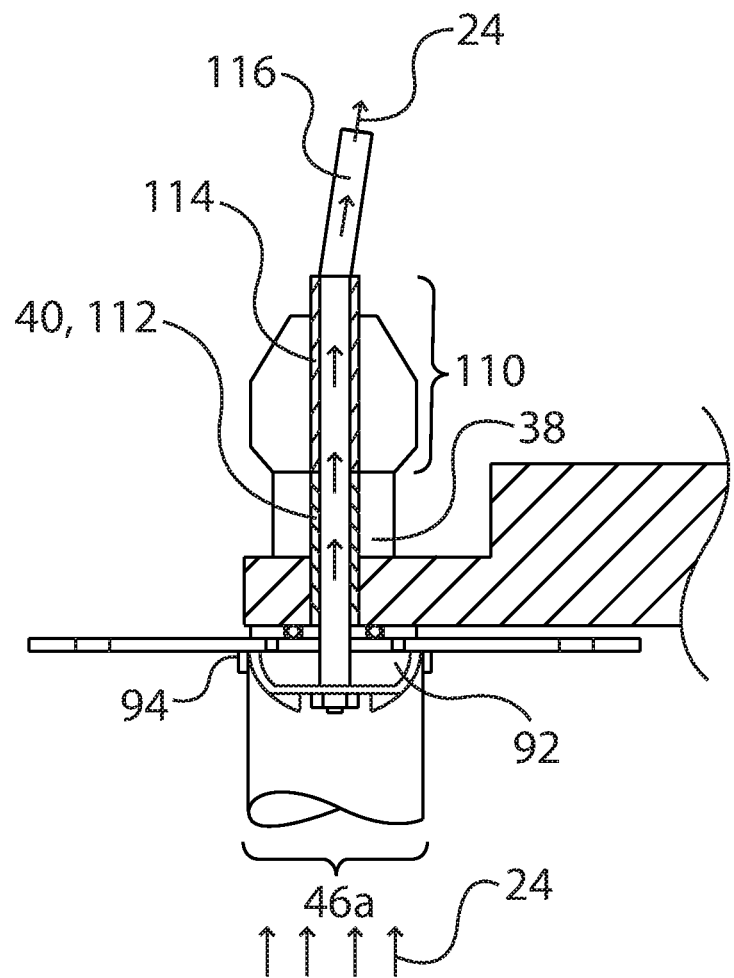
FIG. 10 is an embodiment of FIG. 2 showing a non-threaded flat type plug.
Figure 11:
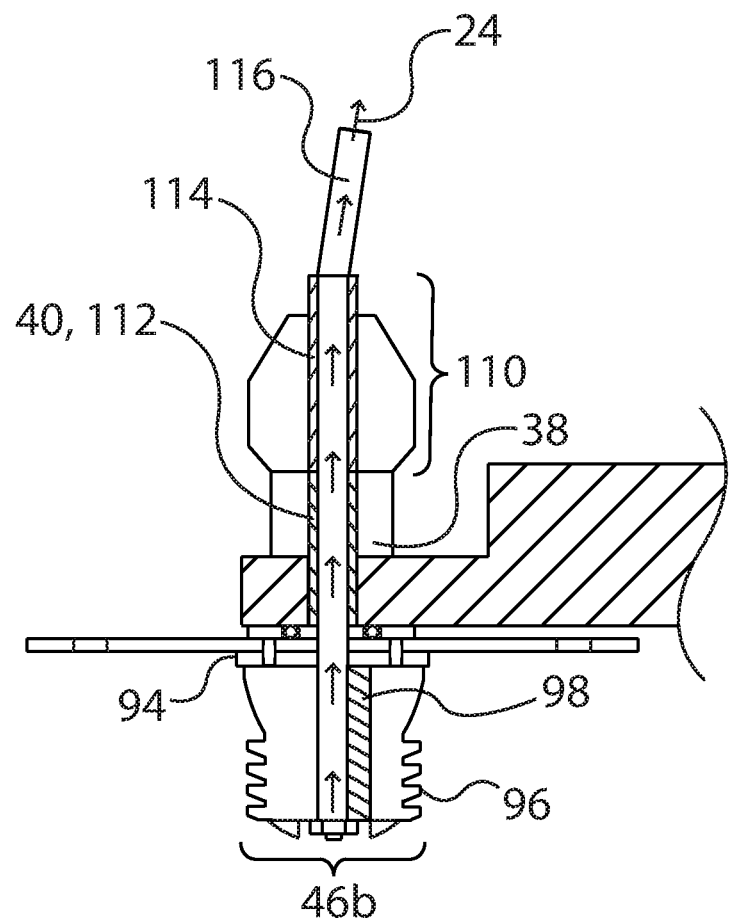
FIG. 11 is an embodiment of FIG. 2 showing a semi-conical rubber coated plug with back-side fins.
Figure 12:
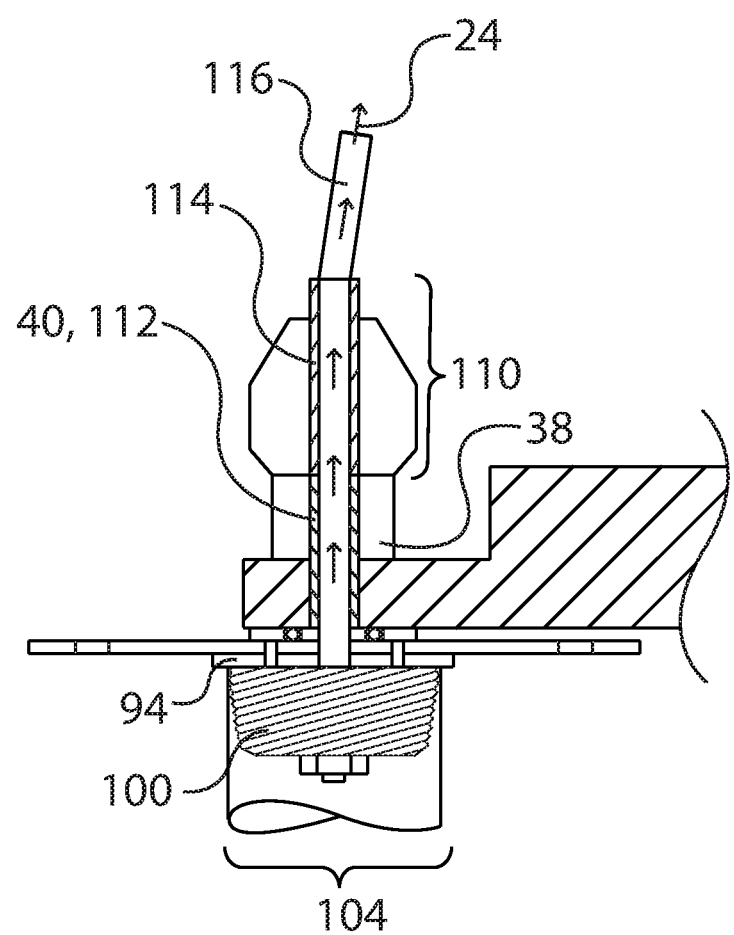
FIG. 12 is an embodiment of FIG. 2 showing a case-hardened semi-conical self-blocking threaded cylinder solid plug.
Figure 13:
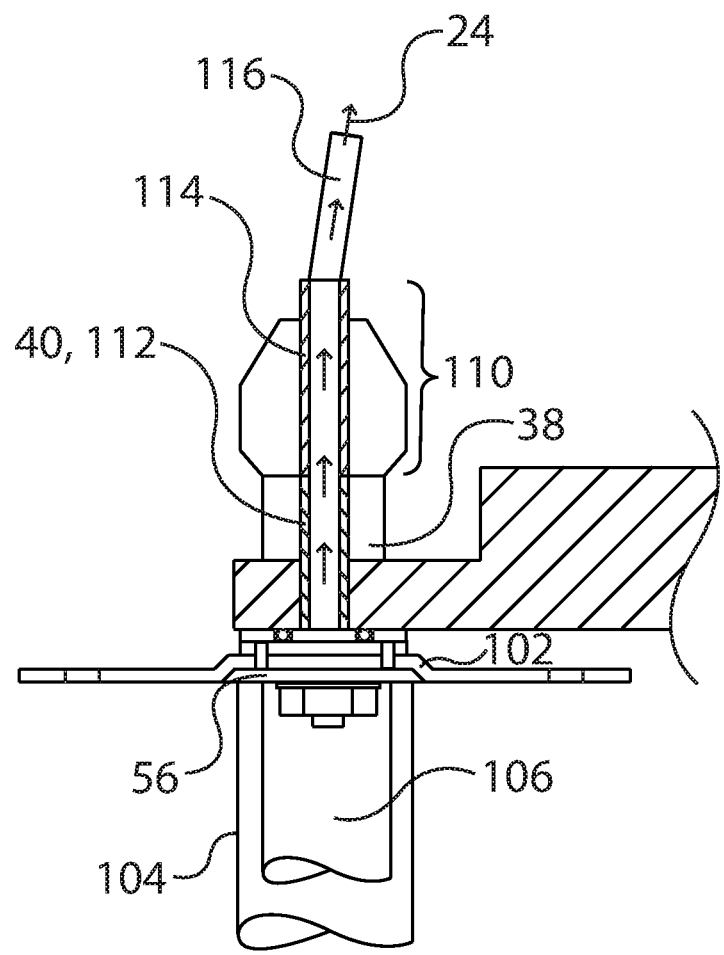
FIG. 13 is an embodiment of FIG. 2 showing a depressed center diamond cutting saw.
Figure 14:
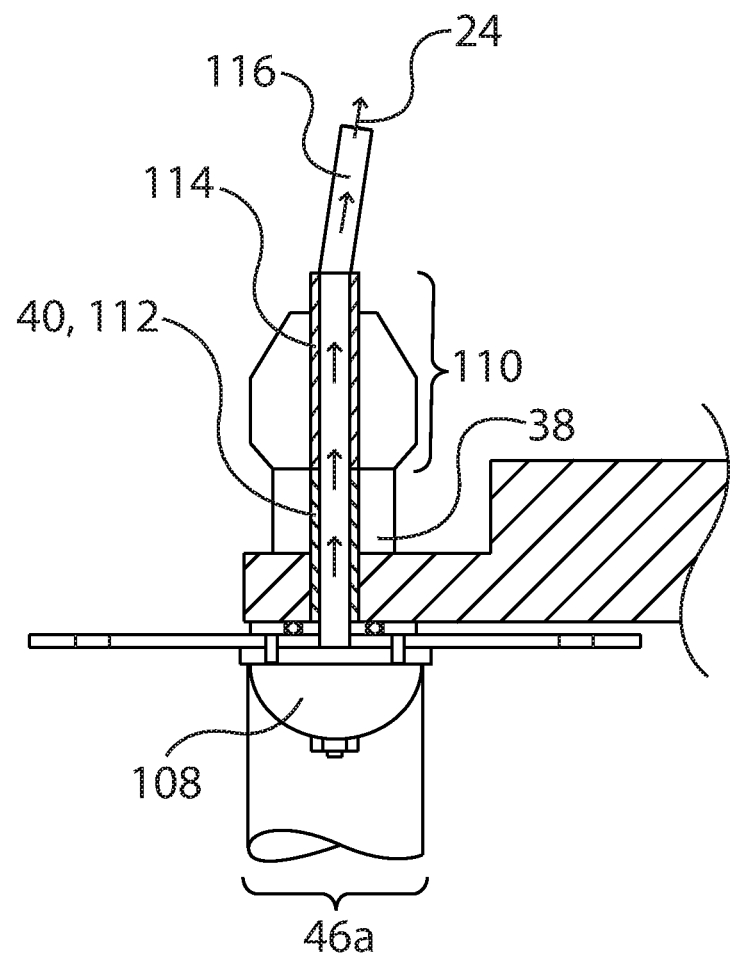
FIG. 14 is an embodiment of FIG. 2 showing a hemi-spherical lead plug.
Figure 15:
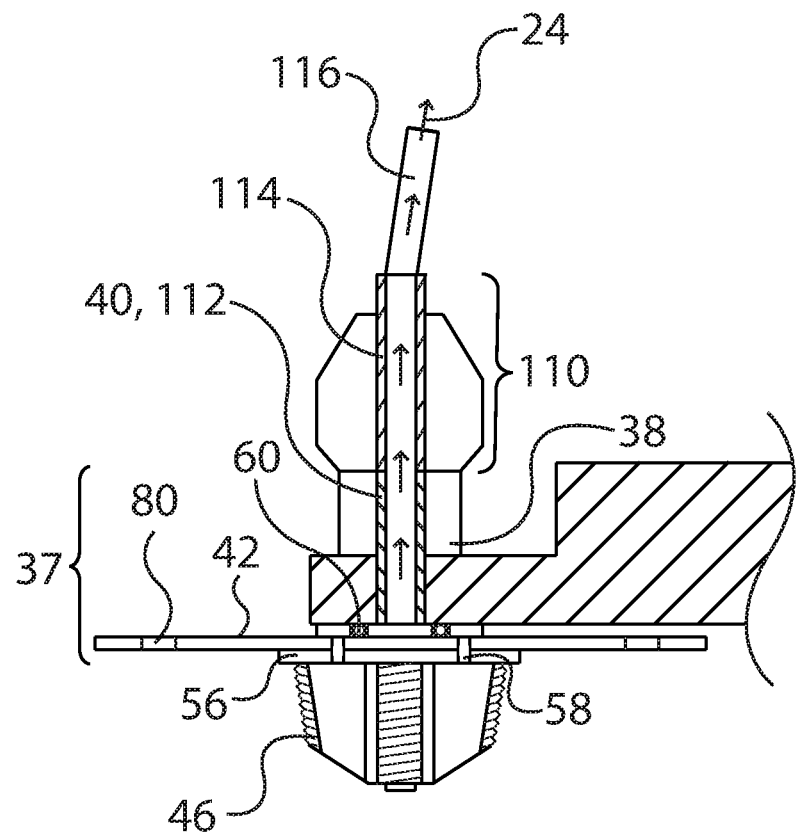
FIG. 15 is an embodiment of FIG. 2 showing a tapered threaded forming plug.
Figure 16:
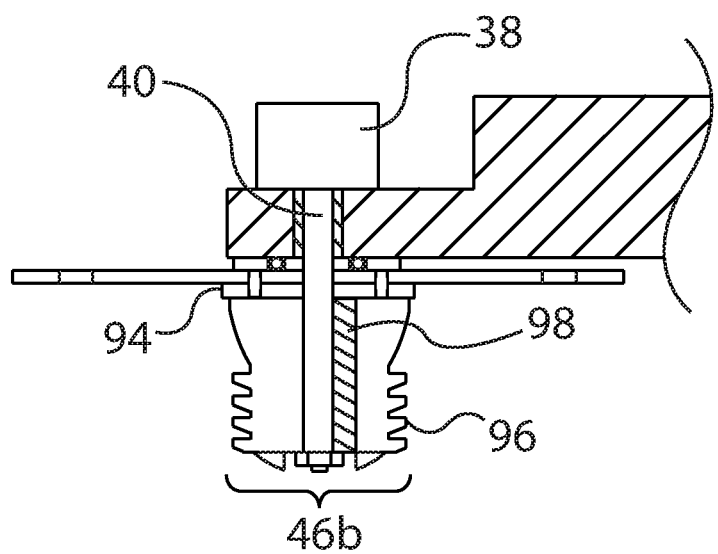
FIG. 16 is an embodiment of FIG. 2 showing a semi-conical rubber coated plug with back-side fins and a solid shaft to retain oil under pressure.
Figure 17:
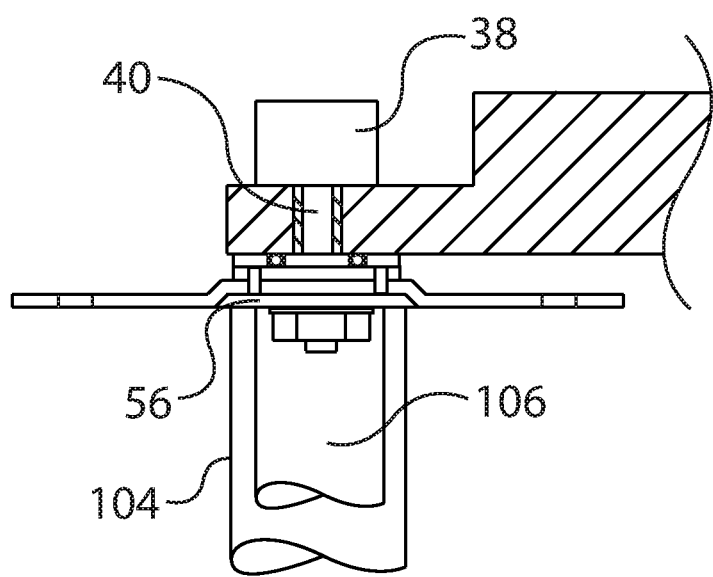
FIG. 17 is an embodiment of FIG. 2 showing a depressed center diamond cutting saw and a solid shaft to retain oil under pressure.

Different types of pipe plugs 46 are proposed to cover different situations. FIG. 10 shows a flat type plug 46a with metallic core 92 (aluminium or other) and external synthetic rubber material 94 as seal. FIG. 11 shows a semi-conical rubber coated plug 46b with back-side fins 96 and aluminium or plastic insert 98. Similar types of plugs are of standard use in oil industry (cementing plugs). FIG. 12 shows a solid threaded case-hardened semi-conical self-blocking plug 100. FIG. 13 shows a variant of a depressed center diamond cutting saw. This type of saw has the seal 56 embedded in the central depression 102. The advantage of this variant is that the device could be used to cut and plug multi-centered pipes like a riser 104 with internal producing pipe 106. FIG. 14 shows a hemispherical lead plug. FIG. 15 shows a tapered threaded forming plug. FIG. 16 shows a semi-conical rubber coated plug with back-side fins and a solid shaft to retain oil under pressure. FIG. 17 shows a depressed center diamond cutting saw and a solid shaft to retain oil under pressure.

In alternative embodiments arm 30 may take on various forms. For example arm 30 could have a dual second 34 end formed in a Y where cutting device 37 is on a first portion of the Y and pipe plug 46 is on a second portion of the Y. Arm 30 is then rotated and extended relative to rod axis 50 to two different positions, one for cutting and one for plugging. Device 20 may further have two separate arms 30 that rotate around rod axis 50 with cutting device 37 on one arm and pipe plug 46 on the other arm. Arm 30 may be an articulated arm with multiple joints.

Device 20 may be position to attach to pipe 22 by a subwater placement system. Subwater placement system is at least one from the group consisting of a set of cables, an arm of a submarine and a remotely operated vehicle.

While several embodiments of the invention, together with modifications thereof, have been described in detail herein and illustrated in the accompanying drawings, it will be evident that various further modifications are possible without departing from the scope of the invention. The scope of the claims should not be limited by the preferred embodiments set forth in the examples, but should be given the broadest interpretation consistent with the description as a whole.

What is claimed is:

1. A device for cutting and plugging an underwater pipe, the pipe having a pipe axis, comprising:
   a) a frame supporting at least one clamp for attaching said frame to the pipe;
   b) an arm having a first end and second end;
   c) an actuation element integrated with said frame, said first end of said arm connected to said actuation element;
   d) a cutting device attached to said second end of said arm, said cutting device positionable by said arm to cut the pipe transversely to the pipe axis;
   e) a pipe plug mounted to said second end of said arm, said pipe plug positionable by said arm to plug the pipe after the pipe is cut; and
   f) wherein said first end of said arm is rotatably connected to said actuation element.

2. A device as recited in claim 1, wherein said actuation element is a main cylinder, said main cylinder having an actuation rod with a rod axis, said actuation rod extendable and retractable along said rod axis.

3. A device as recited in claim 2, wherein said actuation rod is extendable and retractable parallel to said pipe axis.

4. A device as recited in claim 2, further comprising a pivot cylinder for rotating said arm around said rod axis.

5. A device as recited in claim 1, wherein said cutting device includes a motor attached to said second end of said arm, said motor having a motor shaft, a saw blade mounted to said motor shaft.

6. A device as recited in claim 5, wherein said pipe plug is mounted concentric with said motor shaft.

7. A device as recited in claim 5, wherein said motor shaft is connected perpendicular to said arm.

8. A device as recited in claim 1, wherein said cutting device is at least one from the group consisting of a rotary saw, a band saw and a laser.

9. A device as recited in claim 1, wherein said at least one clamp is two clamps spaced apart parallel to the pipe axis.

10. A device as recited in claim 1, further comprising a support bar mounted to said frame, said support bar extendable and retractable parallel to said pipe axis.

11. A device as recited in claim 1, further comprising an arm stop.

12. A device as recited in claim 5, wherein said saw blade has a continuous cutting rim and a regularly perforated main body.

13. A device as recited in claim 12, wherein said main body is one from the group consisting of a trellis, lattice and grating.

14. A device as recited in claim 5, wherein said saw blade has a central depressed region.

15. A device as recited in claim 14, including a plugging seal embedded in said central depressed region.

16. A device as recited in claim 15, wherein said plugging seal is made of at least one from the group consisting of rubber, metal and synthetic polymer.

17. A device as recited in claim 1, wherein said pipe plug is a solid body plug or a case-hardened thread forming tool.

18. A device as recited in claim 1, wherein said pipe plug is one from the group consisting of a semispherical plug, flat plug, semi-conical plug, self-blocking plug, inflatable plug and expandable plug.

19. A device as recited in claim 1, wherein said device is operated by at least one from the group of hydraulically, mechanically or electrically.

20. A device as recited in claim 1, further comprising a subwater placement system for placing the device next to the underwater pipe.

21. A device as recited in claim 20, wherein said subwater placement system is at least one from the group consisting of a set of cables, a submarine and a remotely operated vehicle.

22. A device for cutting and plugging an underwater pipe, the pipe having a pipe axis, comprising:
   a) a frame supporting at least one clamp for attaching said frame to the pipe;
   b) an arm having a first end and second end;
   c) an actuation element integrated with said frame, said first end of said arm connected to said actuation element;
   d) a cutting device attached to said second end of said arm, said cutting device positionable by said arm to cut the pipe transversely to the pipe axis;
   e) a pipe plug mounted to said second end of said arm, said pipe plug positionable by said arm to plug the pipe after the pipe is cut;
   f) a motor attached to said second end of said arm, said motor having a motor shaft with a saw blade mounted to said motor shaft; and
   g) wherein said pipe plug is mounted concentric to said cutting device.

23. A device for cutting and plugging an underwater pipe, the pipe having a pipe axis, comprising:
   a) a frame supporting at least one clamp for attaching said frame to the pipe;
   b) an arm having a first end and second end;
   c) an actuation element integrated with said frame, said first end of said arm connected to said actuation element;
   d) a cutting device attached to said second end of said arm, said cutting device positionable by said arm to cut the pipe transversely to the pipe axis;
   e) a pipe plug mounted to said second end of said arm, said pipe plug positionable by said arm to plug the pipe after the pipe is cut; and
   f) a motor attached to said second end of said arm, said motor having a hollow motor shaft that provides a passageway for fluids flowing from the pipe to be collected after the pipe is plugged.

24. A device for cutting and plugging an underwater pipe, the pipe having a pipe axis, comprising:
   a) a frame supporting at least one clamp for attaching said frame to the pipe;
   b) an arm having a first end and second end;
   c) an actuation element integrated with said frame, said first end of said arm connected to said actuation element;
   d) a cutting device attached to said second end of said arm, said cutting device positionable by said arm to cut the pipe transversely to the pipe axis;
   e) a pipe plug mounted to said second end of said arm and concentric with said cutting device, said pipe plug is a threaded pipe plug positionable by said arm to plug the pipe after the pipe is cut;
   f) a motor attached to said second end of said arm and wherein said motor drives said threaded pipe plug into the cut pipe along the pipe axis.

* * * * *